United States Patent
Landgraf et al.

(10) Patent No.: US 6,526,832 B2
(45) Date of Patent: Mar. 4, 2003

(54) DISK-SHAPED SILICON SENSOR ELEMENT FOR A PRESSURE SENSOR AND PRESSURE SENSOR USING SUCH A SILICON SENSOR ELEMENT

(75) Inventors: Hans-Peter Landgraf, Regensburg (DE); Henderikus-L. Offereins, Langquaid (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/131,367

(22) Filed: Apr. 24, 2002

(65) Prior Publication Data

US 2002/0152817 A1 Oct. 24, 2002

(30) Foreign Application Priority Data

Apr. 24, 2001 (DE) .......................... 101 20 069

(51) Int. Cl.⁷ .............. G01L 9/00; G01L 9/16
(52) U.S. Cl. ........................................ 73/754
(58) Field of Search .................. 73/715, 716, 717, 73/719, 720, 721, 722, 723, 725, 726, 727, 754

(56) References Cited

U.S. PATENT DOCUMENTS 5,195,020 A * 3/1993 Suzuki et al. ............... 257/714
5,691,479 A * 11/1997 Krisch et al. ................. 73/756

FOREIGN PATENT DOCUMENTS

EP          0 710 826 A2   5/1996

* cited by examiner

Primary Examiner—William Oen
(74) Attorney, Agent, or Firm—Laurence A. Greenberg; Werner H. Stemer; Ralph E. Locher

(57) ABSTRACT

A disk-shaped silicon sensor element for a pressure sensor is described. The sensor element has a disk upper side, a disk underside, stress measuring elements that convert mechanical stresses into signals, and circuits disposed on the disk upper side. The disk underside serves during a pressure measurement for receiving a force that acts as a bending pressure for bending the disk-shaped silicon sensor element. The sensor element is formed with essentially the same thickness over its entire extent.

13 Claims, 4 Drawing Sheets

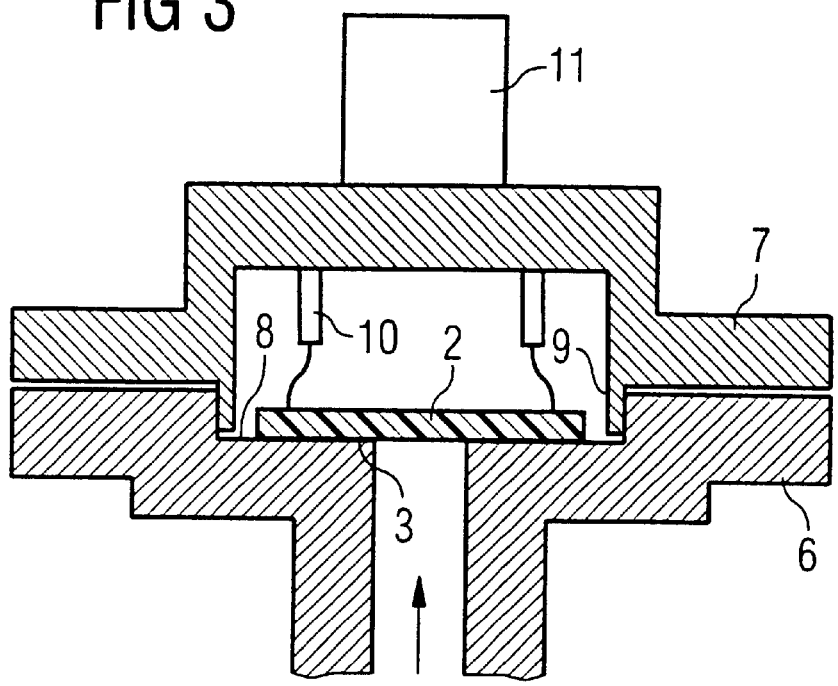
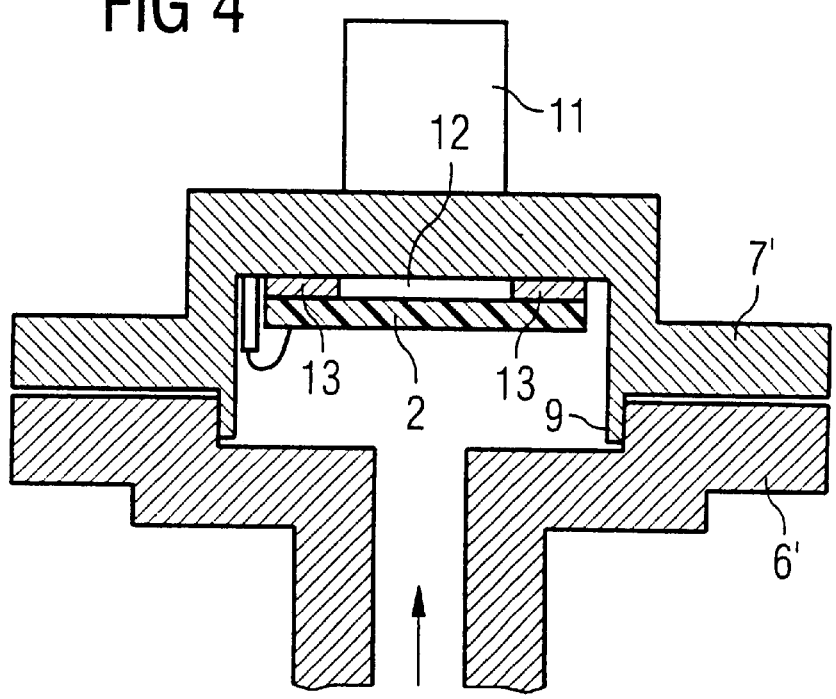

DISK-SHAPED SILICON SENSOR ELEMENT FOR A PRESSURE SENSOR AND PRESSURE SENSOR USING SUCH A SILICON SENSOR ELEMENT

BACKGROUND OF THE INVENTION

Field of the Invention

The invention relates to a disk-shaped silicon sensor element for a pressure sensor. The sensor element has a disk upper It side, a disk underside, stress measuring elements for converting mechanical stresses into signals, and circuits disposed on the disk upper side. The disk underside serves during a pressure measurement for receiving a force leading to bending of the disk-shaped silicon sensor element. The invention also relates to a pressure sensor in which such a silicon element is used.

For measuring pressures in a range from 1 to about 200 bar, measuring sensors with silicon-based pressure sensors are predominantly used.

In a first type of construction of silicon sensor elements, a thin diaphragm is formed in a region of a silicon carrier material by use of an isotropic or anisotropic etching technique. The diaphragm, which is much thinner than the remaining silicon carrier material, is deformed under the effect of pressure. The deformation is converted into an electrical signal at the locations at which the greatest pressure-proportional stresses occur, with the aid of piezoresistive resistors disposed in the silicon in the region of the diaphragm. The disadvantage of the measuring sensors is that different diaphragm sizes and thicknesses have to be produced for different pressure ranges, in order to meet the requirements concerning sensitivity and rupture pressure. Therefore a separate set of masks for each pressure range is necessary for the photolithographic production and consequently leads to higher costs. What is more, the micromechanical structuring by an etching technique is an rile expensive process step. To obtain as many sensors as possible from a silicon wafer, the surface area of the sensors is minimized, resulting in very small and thin diaphragms. At the same time, the region of the diaphragm must not be disturbed with regard to its mechanical behavior. Therefore, apart from the piezoelectric resistors mentioned, the silicon carrier material must remain unused in the region of the diaphragm.

In the case of a further type of construction of measuring sensors, polysilicon diaphragms produced in a CMOS process are used as capacitive pressure sensors. The diaphragms, under the effect of pressure, lead to a change in a capacitance between the diaphragm and a carrier substrate, which is electrically measured. The additional process steps in the CMOS process make the production of the diaphragms complex and expensive. What is more, in the case of this technology, the diaphragm dimensions must also be adapted to the respective pressure ranges, that additionally makes the production process more expensive.

For higher pressures, from about 200 bar, thin film sensors based on steel or ceramic diaphragms are predominantly used. However, sensors based on this technology cannot be miniaturized unrestrictedly. This is so since the resistors require relatively large dimensions to register the diaphragm deformation. Because, the actual sensor element and the entire sensor electronics are disposed outside the pressure medium, the technique is of interest in particular in the case of pressure measurements in aggressive media. However, this requires a coating and structuring of the individual diaphragms, which greatly increases the expense of the pressure sensors.

SUMMARY OF THE INVENTION

It is accordingly an object of the invention to provide a disk-shaped silicon sensor element for a pressure sensor and a pressure sensor using such a silicon sensor element which overcomes the above-mentioned disadvantages of the prior art devices of this general type, which can be used over a wide pressure range, can be produced on the basis of a low-cost process and offers the possibility of minimizing the dimensions of the pressure sensor.

With the foregoing and other objects in view there is provided, in accordance with the invention, a disk-shaped silicon sensor element for a pressure sensor. The disk-shaped silicon sensor element contains a body having a disk upper side and a disk underside. The body has a given thickness being substantially uniform over an entire extent of the body. Stress measuring elements are supported by the body, the stress measuring elements convert mechanical stresses into electrical signals. Circuits are disposed on the disk upper side. The disk underside serves during a pressure measurement for receiving a force leading to bending of the body.

The object is achieved over the prior art sensor element described at the beginning by the inventive silicon sensor element having essentially the same thickness over its entire extent. The invention in this case departs from the approach, adopted in the prior art for cost reduction, of reducing the size of the diaphragm to accomplish better area utilization. Rather, by increasing the thickness of the pressure-sensitive diaphragm, it takes the opposite approach and, by simultaneously increasing the size of the diaphragm surface area, in this way achieves additional usable surface area for the arrangement of switching and memory elements, so that, in spite of increasing the overall dimensions, there is an overall increase in the area utilization.

Thus, according to the invention, the silicon sensor element continues to be used for pressure measurement in the low-pressure range, but, on account of its essentially constant thickness over virtually its entire extent, the element assumes the function of the diaphragm of the prior-art sensors. Consequently, it is possible to dispense with the production of a separate diaphragm in a silicon body by an expensive etching technique. On the other hand, the production method allows sets of masks that are independent of pressure ranges and allows the amount of material used to be reduced. Moreover, the silicon sensor element according to the invention can be fabricated by simple ASIC production steps, since all that happens is that the silicon carrier is ground thin to produce its final form.

On account of the constant thickness of the silicon sensor element, the invention offers the advantageous development possibility of using the disk upper side entirely for the configuration of measuring elements and further electrical circuits, which was not possible in the case of known pressure sensors. As a result, the sensors according to the invention can fully utilize the expensive silicon carrier material and are therefore less expensive overall.

Different processes by which stress measuring elements convert the mechanical stresses occurring due to the deformation during a pressure measurement into mechanical, electrical or optical signals are possible. It is particularly expedient, for example for the further processing in a processor, to convert the mechanical stresses into electrical signals by stress measuring elements.

Similarly, different techniques known per se can be used for registering the stresses introduced into the silicon sensor element. In a development of the invention, stress measuring elements which have piezoelectric resistors are advantageously used.

Since only the disk underside is required for the introduction of the force producing the bending, the free disk upper side is available for the configuration of devices, for example for processing the signals obtained. According to an advantageous refinement of the invention, therefore, memory elements and/or electrical circuits for signal processing are formed on the disk upper side.

Among the factors determining the thickness of the silicon sensor element are the pressure to be measured and the component dimensions to be achieved. A favorable value for the essentially constant thickness of the silicon sensor lies in the range between 10 and 70 µm.

In the case of a pressure sensor, a sensor carrier expediently serves as a holding and protecting device for the silicon sensor element. According to the invention, a pressure sensor in which a silicon sensor element is connected to the sensor carrier in a direct and pressure-tight manner is provided. In this way, by dispensing with additional sealing carriers or connecting parts, a compact configuration is achieved, reducing the use of parts and the external dimensions of the pressure sensor.

As is known, the sensor carrier and other components of the pressure sensor subjected to pressure consist of pressure resistant material. Suitable as such a material are materials that can be cast, machined or connected by soldering, such as for example ceramic or steel. According to an advantageous refinement of the invention, the sensor carrier is fabricated from ceramic or steel in particular in the region of the pressure-tight connection. In this way it is ensured that the pressure-related deformation occurs exclusively in the region of the silicon sensor element and the measurement is not falsified by pressure losses within the pressure sensor.

To produce a pressure-tight connection between the silicon sensor element and the sensor carrier, force-locking and form locking types of connection and hybrid forms of these are suitable. The pressure-tight connection is advantageously established by one of the following types of connection: adhesive bonding, anodic bonding, eutectic bonding, soldering or glass soldering.

The adaptation of the pressure measuring sensor to the pressure range to be measured can take place in the low pressure range by the choice of a thickness of the silicon sensor element. In order to reduce the material expenditure for pressure sensors that are used in higher pressure ranges, however, the disk underside of the silicon sensor element may be advantageously connected to a pressure diaphragm over its full surface area and with force locking engagement. In the production of such a pressure sensor, it is possible to omit a working step inasmuch as the sensor carrier already has a pressure diaphragm with which the underside of the disk of the silicon sensor is connected over its full surface area and with a force-locking engagement. Consequently, the silicon sensor element is at the same time separated and protected from the pressure-bearing medium, which is advantageous in particular in the case of aggressive media. This construction additionally offers the advantage that the adaptation of a pressure sensor to a specific pressure range does not have to take place by the dimensioning of the expensive and sensitive silicon sensor element, but can be adjusted more easily, and consequently at lower cost, by the thickness of the pressure diaphragm of the sensor carrier. In this way, pressure sensors for pressure ranges of different levels do not differ in the choice of the silicon sensor elements, which are expensive due to the material and electronic components with which they are fitted, but in the use of easily adaptable and relatively inexpensive sensor carriers. As a result, the silicon sensor element becomes a standard component.

On the other hand, for pressure sensors to be used in the low pressure range, it is possible to dispense with a separate pressure diaphragm. The silicon sensor element is dimensioned in such a way that it withstands the pressure on its own and is connected to the sensor carrier over part of its surface area, so that it itself serves as a pressure-loaded diaphragm. This comes close to achieving a same-parts concept for pressure sensors from the low to high pressure measuring range, since the pressure sensors to be used for different ranges differ by only a few, easily producible, and consequently low-cost, components, whereas the complex and cost-intensive silicon sensor element does not vary at all in thickness, or only slightly.

Pressure sensors are used to determine the difference between a pressure occurring and an ambient pressure. For such relative pressure measurements, the silicon sensor element is disposed in the pressure sensor intended for it in such a way that it separates the pressure-loaded region from the atmospheric pressure. On the other hand, it may be required Ps to determine an absolute value, independent of the ambient pressure. For the absolute pressure measurement, pressure sensors are configured in an extremely simple way, in that the silicon sensor element is disposed in such a way that it separates the pressure-loaded region from a reference pressure region.

Other features which are considered as characteristic for the invention are set forth in the appended claims.

Although the invention is illustrated and described herein as embodied in a disk-shaped silicon sensor element for a pressure sensor and a pressure sensor using such a silicon sensor element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a sectional view of a pressure sensor for relative pressure measurement using the silicon sensor shown in FIG. 2A;

FIG. 4 is a sectional view of the pressure sensor for absolute pressure measurement using the silicon sensor shown in FIG. 2A.

DESCRIPTION OF THE PREFERRED EMBODIMENTS

Figure 1A:
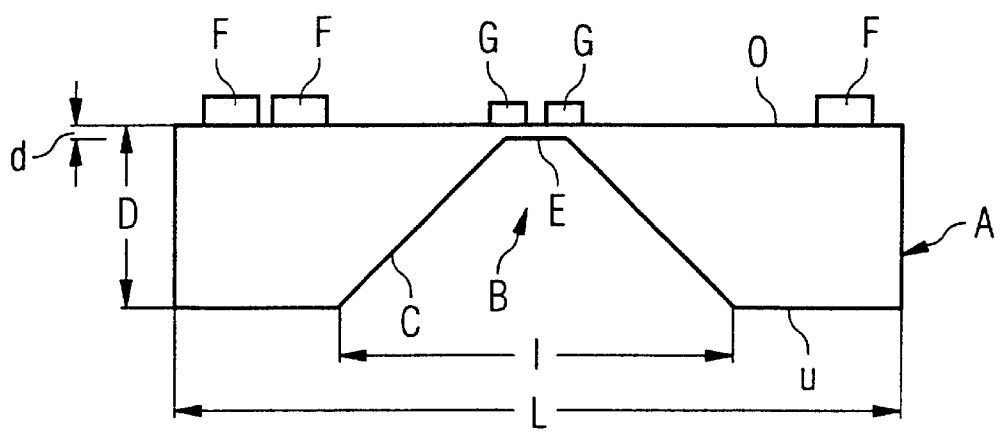
FIG. 1A is a diagrammatic, side-elevational view of a silicon sensor element according to the prior art.
Figure 1B:
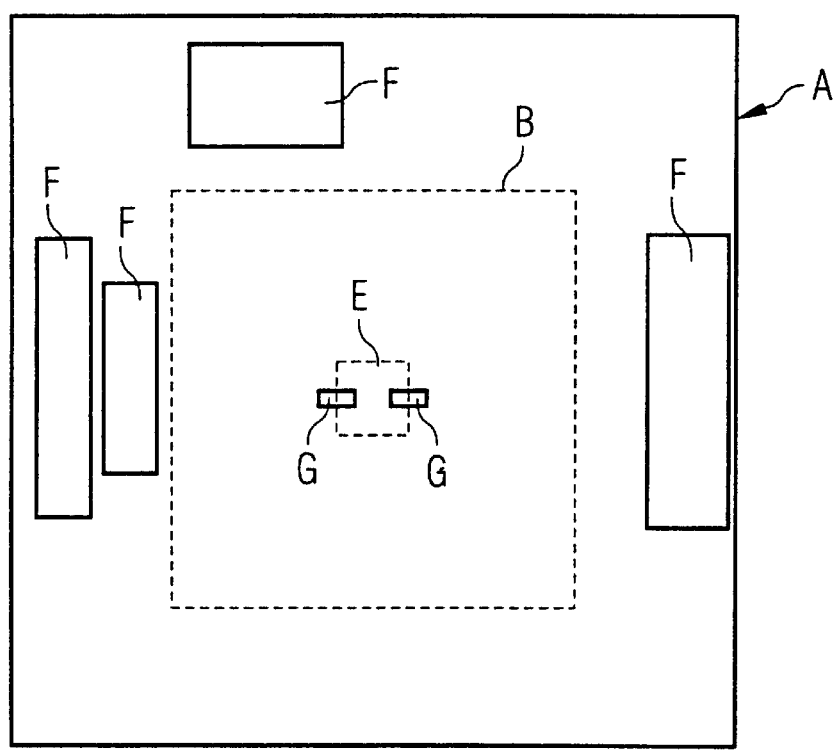
FIG. 1B is a plan view of the sensor shown in FIG. 1A.

Referring now to the figures of the drawing in detail and first, particularly, to FIGS. 1A and 1B thereof, there is shown a silicon sensor element according to the prior art. The sensor element contains a cuboidal silicon body A which is square in plan view and has a disk upper side O and a disk underside U and also an edge length L and a thickness D. It has on the disk underside U a square and funnel-shaped recess B, which is produced by etching and flanks C of which assume an inclination caused by a crystal angle of the silicon. Formed on a base of the recess B is a square diaphragm E, which has a thickness d. The surface areas remaining on the disk underside U serve inter alia for attaching the silicon sensor element on a component of the pressure sensor, such as for example a sensor carrier.

The disk upper side O of the silicon body A serves partly for disposing switching and memory elements F. These are located in that region of the disk upper side O which lies opposite the cutout-free surface area of the disk underside U. The switching and memory elements F can only be disposed in this region, because here they do not influence the mechanical behavior of the diaphragm E. Also disposed on the disk upper side O, and exclusively at the periphery of the diaphragm E, are piezoelectric resistors G, which register maximum stresses of the diaphragm E occurring here during the pressure measurement.

Figure 2A:
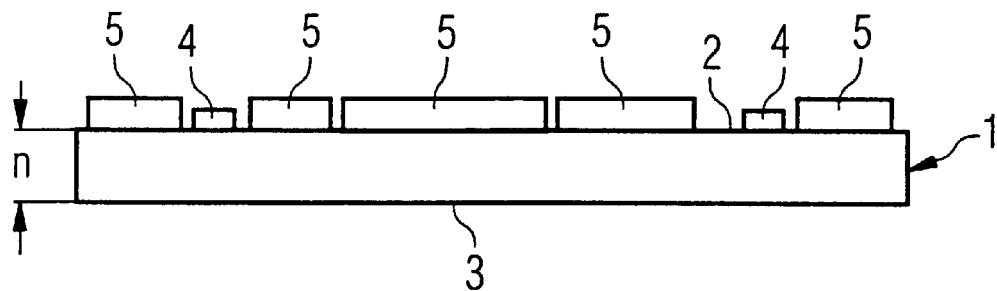
FIG. 2A is a diagrammatic, side-elevational view of the silicon sensor element according to the invention.
Figure 2B:
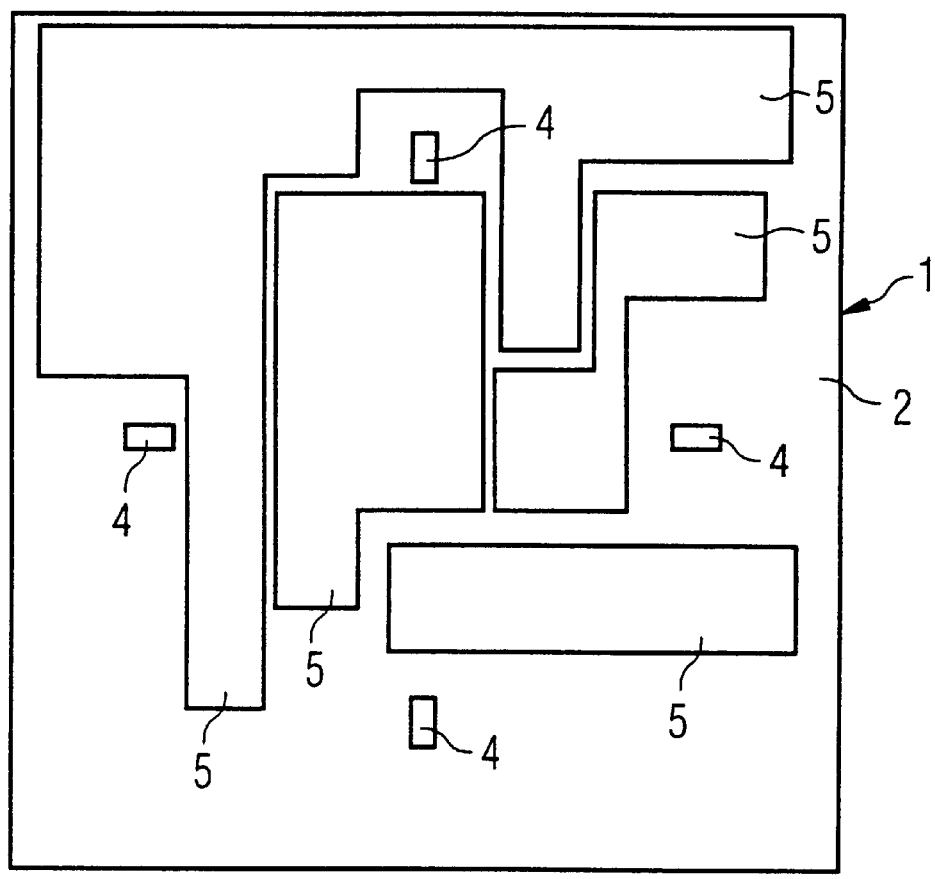
FIG. 2B is a plan view of the sensor shown in FIG. 2A.

FIGS. 2A and 2B show a silicon sensor element 1 with a thickness n remaining constant over its entire extent, a disk upper side 2 and a disk underside 3. The latter serves for holding the silicon sensor element 1 in a pressure sensor, and for receiving a force that leads to the deformation of the silicon sensor element 1. Now the entire silicon body acts in the manner of a diaphragm, since no special pressure-sensitive region is formed. Because the thickness n of the silicon sensor element 1 is relatively great in comparison with the predominantly stress-sensitive switching and memory elements 5, the latter do not disturb the mechanical behavior of the silicon sensor element 1 under loading and can therefore be disposed on the entire disk upper side 2. In addition, piezoelectric resistors 4 are attached on the disk upper side 2, at the location of greatest loading, to register the deformation of the silicon sensor element 1.

FIG. 3 schematically shows the use of the silicon sensor element 1 according to the invention for relative pressure measurement in a pressure sensor. The rotationally symmetrical housing of the latter is formed essentially by a sensor carrier 6 and an upper housing part 7. The sensor carrier 6 has an upwardly open space, adjoined at its outer edges by flanges. A base 8 has an opening to a feed for a pressure-bearing fluid. The opening is closed by the silicon sensor element 1, in that the latter is connected in a By pressure-tight manner by its disk underside 3 to the base 8. The pressure of a pressure-bearing fluid, acting in the direction of the arrow, consequently acts on the surface area of the disk underside 3 remaining inside the attachment. The space formed by the sensor carrier 6 is closed by the upper housing part 7, which for its part forms a downwardly open space. The outer edges of the latter part are also adjoined by flanges, which correspond to those of the sensor carrier 6 and by which the two housing parts of the pressure sensor are connected to one another. Disposed at the lower edge of the space formed by the upper housing part 7 is a peripheral rib 9, which projects beyond the plane of the flanges and the outer periphery of which corresponds to the inner periphery of the cylindrical space of the sensor carrier 6 and which ensures the centric connection of the two housing parts. Also disposed in the space of the upper housing part 7 are connections 10, which are in electrical connection with a plug 11 on the outer side of the upper housing part 7.

If a pressure-bearing fluid is then passed to the feed and the disk underside 3 is consequently subjected to pressure, the loading, which produces a deformation of the silicon sensor element 1, is registered by the stress measuring elements disposed on the disk upper side 2, processed to form an electrical signal and passed on by the connections 10 to the plug 11. Since the sensor carrier 6 and the upper housing part 7 are not connected to one another in a pressure-tight manner, atmospheric pressure prevails on the disk upper side 2. Therefore, the result of the measurement represents the difference in pressure between the pressure acting on the disk underside 3 and the atmospheric pressure prevailing above the disk upper side 2.

In contrast, FIG. 4 shows a pressure sensor for absolute pressure measurement. The housing of the pressure sensor is formed in principle by the same parts as the pressure sensor as shown in FIG. 3, that is by the sensor carrier 6 and the upper housing part 7. The two parts are connected to one another in a pressure-tight manner. In addition, the silicon sensor element 1 is located in the space of the upper housing part 7 and is attached in such a way that between the silicon sensor element 1 and the upper housing part 7 a reference pressure space 12 is formed by spacers 13, which connect the silicon sensor element 1 in a pressure-tight manner to the upper housing part 7. If pressure is then applied via the feed, it acts on the silicon sensor element 1 and counter to the pressure in the reference pressure space 12. The measured value determined consequently indicates the difference between the pressure acting in the interior of the housing and the always constant reference pressure present in the reference pressure space 12.

Figure 5:
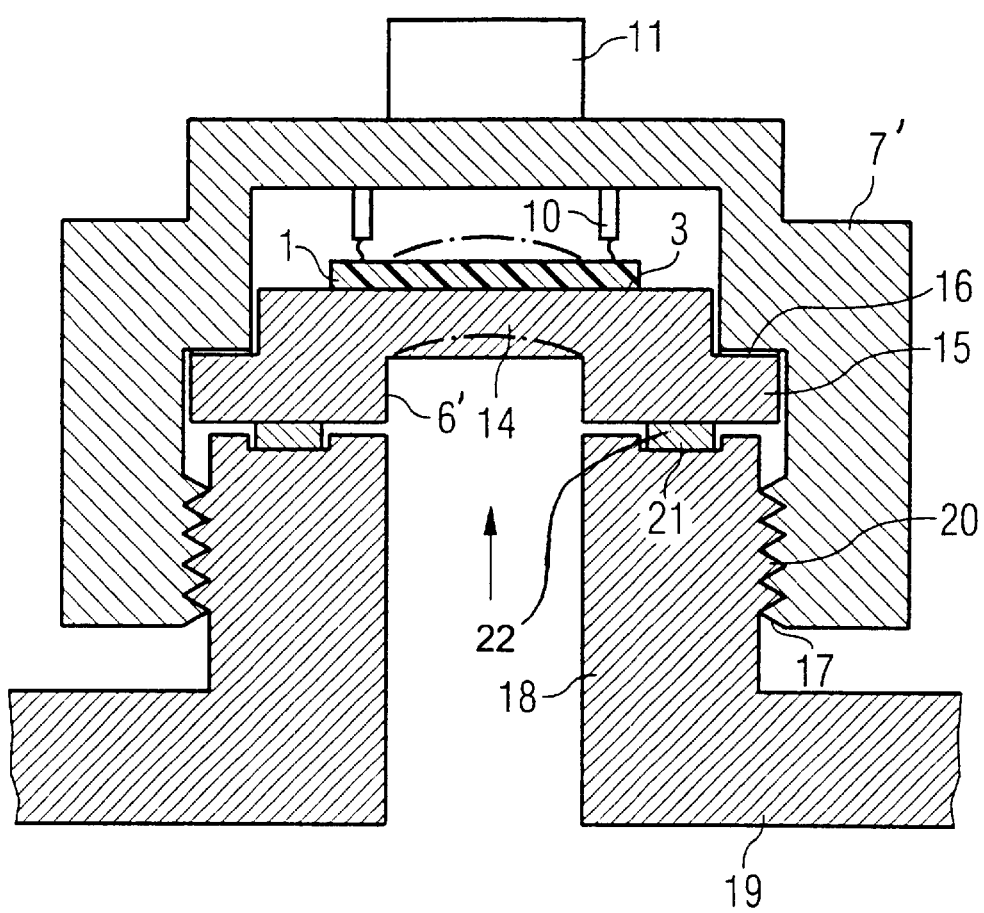
FIG. 5 is a sectional view of the pressure sensor using the silicon sensor shown in FIG. 2A.

FIG. 5 shows a pressure sensor for high pressures. A hat-shaped sensor carrier 6' has a pressure diaphragm 14 which is configured as a cover and on the upper side of which the silicon sensor element 1 is connected by the disk underside 3 over its full surface area and with a force-locking engagement. A brim 15 of the hat-shaped sensor carrier 6' serves both over its upper side and its underside for the connection to further components. The sensor carrier 6' has arching over it a pot-shaped upper housing part 7', on the upper side of which there is the plug 11, which is in electrical contact with the connections 10 in the interior of the upper housing part 7'. The interior of the upper housing part 7' widens by a step 16, so that it is made up of two inner spaces of different diameters. The greater diameter is in this case slightly greater than the outer diameter of the brim 15, the smaller diameter is slightly greater than the remaining hat part of the sensor carrier 6'. The matching serves for the centering of the sensor carrier 6' in the upper housing part 7'. At the edge of the pot of the upper housing part 7', and consequently in the region of the greater inner diameter, there is an internal thread 17 for the connection of the upper housing part 7' to a lower housing part 18. This has, for the purpose of feeding a pressure-bearing medium, the form of a thick-walled tube, which has on the pressure inlet side an annular flange 19 for attachment of the lower housing part 18 and consequently of the pressure sensor to other components. On its lateral surface area, it also bears an external thread 20 and, on its end face on the pressure outlet side, a groove 21 for receiving an annular seal 22. Resting on the latter is the underside of the brim 15, on the upper side of which bears the underside of the step 16. If the upper housing part 7' is then screwed onto the lower housing part 18 by the internal thread 17 and an external thread 20, the step 16 presses the sensor carrier 6' against the seal 22, and consequently against the lower housing part 18, so that a pressure-tight connection exists between the sensor carrier 6' and the lower housing part 18. If pressure is applied to the lower housing part 18 in the direction of the arrow, it acts on the sensor carrier 6' and leads to a deformation of the diaphragm 14. The silicon sensor 1 connected to the latter experiences this deformation as elongation. As in the case of the previous embodiments, the resultant stress is registered, electronically converted and passed on as a signal via connections 10 to a plug 11.

A force-locking connection is one that connects two elements together by force external to the elements, as opposed to a form-locking connection, which is provided by the shapes of the elements themselves. A form-locking connection is one that connects two elements together due to the shape of the elements themselves, as opposed to a force-locking connection, which locks the elements together by force external to the elements.

We claim:

1. A disk-shaped silicon sensor element for a pressure sensor, the disk-shaped silicon sensor element comprising:
   a body having a disk upper side and a disk underside, said body having a given thickness being substantially uniform over an entire extent of said body;
   stress measuring elements supported by said body, said stress measuring elements converting mechanical stresses into electrical signals; and
   circuits disposed on said disk upper side, and said disk underside serving during a pressure measurement for receiving a force leading to bending of said body.

2. The silicon sensor element according to claim 1, wherein said disk upper side can be used over its full surface area for a configuration of said stress measuring elements and said circuits.

3. The silicon sensor element according to claim 1, wherein said stress measuring elements have piezoelectric resistors.

4. The silicon sensor element according to claim 1, wherein said circuits include at least one of memory elements and electrical circuits for signal processing.

5. The silicon sensor element according to claim 1, wherein said given thickness has a value range of 10 to 70 $\mu$m.

6. A pressure sensor, comprising:

a sensor carrier;

a silicon sensor element force-lockingly connected to said sensor carrier, said silicon sensor element including:
   a body having a disk upper side and a disk underside, said body having a given thickness being substantially uniform over an entire extent of said body;
   stress measuring elements supported by said body, said stress measuring elements converting mechanical stresses into electrical signals; and
   circuits disposed on said disk upper side, and said disk underside serving during a pressure measurement for receiving a force leading to bending of said body.

7. The pressure sensor according to claim 6, wherein said sensor carrier is formed of a material selected form the group consisting of ceramic and steel.

8. The pressure sensor according to claim 7, wherein said sensor carrier is connected to said silicon sensor element with a pressure-tight connection, and said material is disposed in a region of said pressure-tight connection.

9. The pressure sensor according to claim 8, wherein said pressure-tight connection is formed by a connection selected from the group consisting of an adhesive bonding connection, an anodic bonding connection, an eutectic bonding connection, a soldering connection and a glass soldering connection.

10. The pressure sensor according to claim 6, wherein said sensor carrier has a pressure diaphragm and said disk underside of said silicon sensor element is force-lockingly connected over a full surface area of said pressure diaphragm.

11. The pressure sensor according to claim 6, wherein said silicon sensor element is connected over a par t of said sensor carrier, and said silicon sensor element serves as a pressure-loaded diaphragm.

12. The pressure sensor according to claim 6, wherein said silicon sensor element is connected to said sensor carrier so as to separate a pressure-loaded region from a atmospheric pressure for relative pressure measurements.

13. The pressure sensor according to claim 7, wherein said silicon sensor element is connected to said sensor carrier so as to separate a pressure-loaded region from a reference pressure region for absolute pressure measurements.

* * * * *